June 4, 1935.  R. C. ROE  2,003,496
HEAT STORAGE DEVICE
Filed July 19, 1933    2 Sheets-Sheet 2

Ralph C. Roe INVENTOR.

Patented June 4, 1935

2,003,496

UNITED STATES PATENT OFFICE 2,003,496

HEAT STORAGE DEVICE

Ralph C. Roe, Englewood, N. J., assignor of one-half to Stephen W. Borden, Summit, N. J.

Application July 19, 1933, Serial No. 681,080

16 Claims. (Cl. 219—39)

This invention pertains to heat storage devices and more especially to a type of heater for use in residences for heating rooms from heat produced by electricity and stored and used at such times as may be desired.

Among the objects of my invention are: A heat storage device in which the heat storage substance may be heated to a temperature about ten times that required for maximum room temperature and in which the heat losses, when heat is not required in the room, are sufficiently low to keep the operating costs within reasonable limits.

Further objects and the nature and advantages of the invention will become apparent on consideration of the following specification taken in conjunction with the accompanying drawings.

With respect to the drawings, which are more or less diagrammatic:

Figure 1:
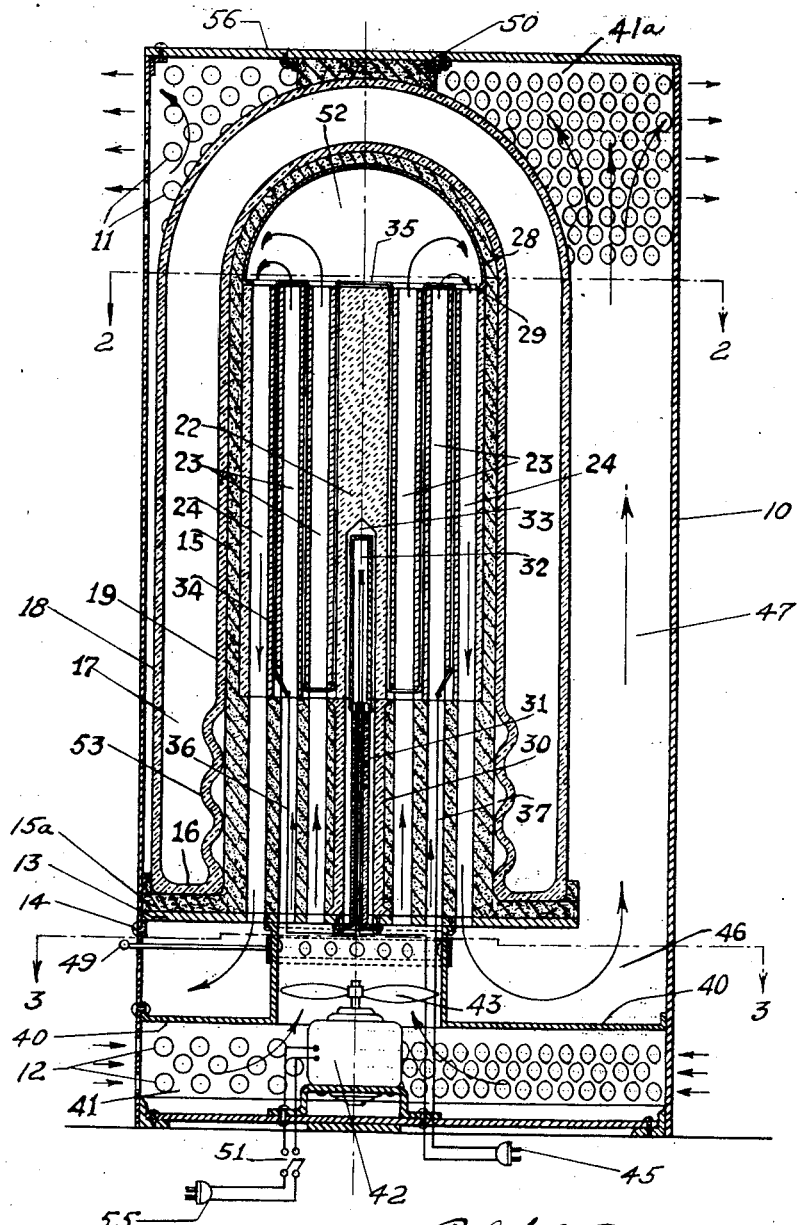
Fig. 1 is a dissymmetrical vertical section of a complete heater, taken on the line 1—1 of Fig. 2.
Figure 3:
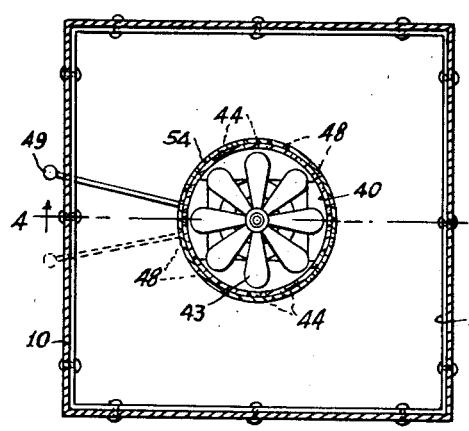
Fig. 3 is a horizontal section on the line 3—3 of Fig. 1.

In the drawings, reference character 10 designates an exterior casing, usually of metal, in the sides of which, near the top, are apertures 11, for the exit of heated air to the room and near the bottom are apertures 12 for admittance of cold air to be heated. A circular plate 13 is attached to the casing 10, as by means of screws 14. Resting on plate 13 is a hollow structure 15 composed of heat insulating material, cylindrical in form, closed by a dome at the top and having a wide flange, 15a, at the bottom. Resting on the flange is a double walled, cylindrical housing 16, both walls of which, 18 and 19, merge into domes at their tops and are joined together at their bottoms so as to form an hermetically sealed chamber 17, which is vacuumized.

Located inside the cylinder 15 is a soapstone block 22 supported from plate 13 by a hollow porcelain spool 30 and also my structure 15 which is solid between the block and the plate except for the airways 23 and 24 which extend vertically from the bottom of the plate to the top of the soapstone block. A steel dome 28, having a flange 29 resting upon the block 22, distributes the weight of the block evenly over the dome of the inner wall of the vacuum chamber in case the heater is inverted, as in transportation.

In the center of block 22 is a hole 33, in which is located a thermostat 32, mounted on a hollow spool of heat insulating material 31, the hollow center serving as a raceway for the electric wires running to the thermostat. The thermostat is connected in series with a resistance wire 35 which is threaded through small holes, as 34, drilled through the soapstone block, and the whole is connected, as by leads 36 and 37, to electric circuit 45.

Attached to the bottom of plate 13 is a circular metal partition 40 having at its bottom a flange extending outwardly in all directions to the outer case 10. At its top it is attached to the plate 13 in a location to divide the airways 23 and 24 into two groups, as clearly shown in Fig. 2, thus connecting the lower ends of one set of airways with the cold air intake chamber 41 and connecting the lower ends of the other set of airways with the hot air flue 47 via air passage 46. The tops of both sets of airways open into space 52. The partition 40 is provided with adjustable apertures, shown in detail in Fig. 4, for admitting cold air into the air passage 46.

Within the space inside the partition 40 is located fan 43, driven by motor 42, operated by circuit 45 and controlled by switch 51.

Figure 2:
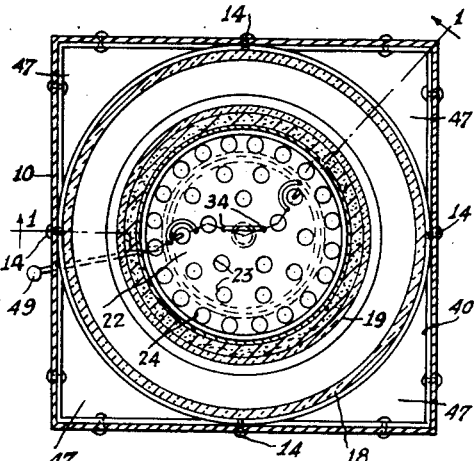
Fig. 2 is a horizontal section on the line 2—2 of Fig. 1.

Since the plate 13 is round and the space enclosed by outer casing 10 is square, there is a resulting air flue 47 in each of the four corners, plainly shown in Fig. 2. The air flues merge into hot air chamber 41a.

A block of heat insulating material 50 is placed between the top 56 and the dome of the outer wall 18 to hold the parts in place in case the heater is inverted.

The lower portion of the inner wall is corrugated, as shown at 53, in order to increase the length of the heat leakage path.

Figure 4:
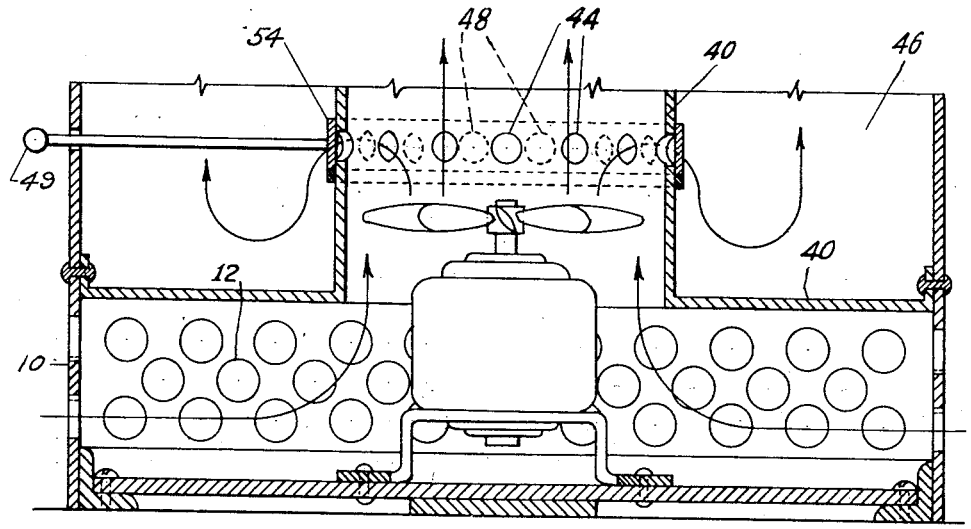
Fig. 4 is a double size vertical section on line 4—4 of Fig. 3.

As shown in Fig. 4, the top of partition 40 is provided with evenly spaced apertures, as 44, around the entire circumference. On the outside of the partition is located a metal band 54, also provided with apertures, as 48, of the same size and number as apertures 44 and located to coincide therewith when band 54 is rotated to a suitable position. The apertures 44 and 48 are so located that the space between apertures is greater than the width of the apertures and the entire band 54 may be moved, from the outside of case 10 by lever 49, so that the band will entirely cover the apertures in partition 40 or cover them to such a degree as may be desired.

The operation of the device is as follows. Current for heating the soapstone block is furnished by circuit 45, which may be a time controlled circuit from which current may be had at very low rates during certain hours of the day. Circuit 55 is a constantly energized circuit. So long as 45 is energized current flows through the heating wire 35 until the soapstone block reaches a predetermined temperature, which may be close to 1000 degrees Fah., when the thermostat 32 opens the circuit. When the temperature has dropped to a predetermined point the thermostat again closes the circuit.

When it is desired to draw heat from the device, the switch 51 is closed starting the fan 43. The fan draws cold air in through apertures 12 and forces it upwards through airways 23 into space 52 and thence downwards through airways 24 into air passage 46 and thence upwards through hot air flues 47 and out through apertures 11 into the room to be heated.

As the air from the heater enters air chamber 46 it is too hot to be discharged into a living room with safety and it is therefore tempered, to such an extent as may be desired, by mixing it with cold air let into passage 46 through the apertures in partition 40 and band 54.

When the fan is not running there is no flow of air through the heater because the high temperature columns of air in airways 23 and 24 are in static balance and tend to remain so, due to the fact that they are vertical and of equal heights and equal temperatures. Because of their relatively high temperatures a considerable difference in pressure is necessary to unbalance them and cause a flow and with the very high insulation values provided there is no way in which a sufficient difference in pressures can be produced by the heat itself. In any case the tempering openings in partition 40 would nullify any pressure which might be produced by the heat alone.

The construction of the vacuumized chamber 17 may be similar to that of the well known "Thermos bottle".

It is clear that that portion of the casing 10 which is above the plate 13 is not essential to the operation of the device as the heated air may be discharged directly from chamber 46 into the room.

Due to the high specific heat of soapstone and the high temperature at which it may be worked, without deterioration, it is possible to store a relatively large number of heat units per cubic foot of storage material.

The fact that soapstone is an electrical insulating material makes it possible to utilize an uninsulated resistance wire as the heating element.

What I claim is:

1. A heat storage device which includes: a block of heat storage material; a heat insulating member surrounding the block; vertical airways through the block; a partition at the bottom of the airways dividing the airways into two groups; an air space within the insulating member connecting together the tops of the two groups of airways; an enclosure for the whole, spaced apart from the insulating member to form vertical air flues extending from the bottom to the top of the insulating member, the enclosure extending above and below the insulating member, that portion below the insulating member being divided, by the before mentioned partition, into two chambers one of which is an air chamber in communication with one set of airways and having air inlet apertures in the sides of the enclosure and the other of which is an air passage connecting the lower end of the other group of airways with the lower end of the vertical air flues; an air chamber in the upper portion of the enclosure and in which the air flues terminate, said chamber having air outlet apertures in the casing wall; the whole forming a closed air passageway from the air inlet apertures through the heat storage block to the air outlet apertures; means located in the air passageway for producing a flow of air therethrough; and means for heating the block.

2. A heat storage device according to claim 1 characterized by the fact that the heat insulating member includes a vacuumized chamber.

3. A heat storage device according to claim 1 characterized by the fact that the partition is provided with air apertures for admitting cold air into the hot air outlet passage for tempering the hot air.

4. A heat storage device according to claim 1 characterized by the fact that the means for producing the air flow is a fan.

5. A heat storage device according to claim 1 characterized by the fact that the enclosure is square and the heat insulating member is round and of such diameter as to fit inside the square, thus forming air flues in the inside corners of the squares.

6. A heat storage device according to claim 1 characterized by the fact that the means for heating the block includes an uninsulated electrical resistance wire arranged in heat exchange relation with the block.

7. A heat storage device according to claim 1 characterized by the fact that the heat storage block is a non-conductor of electricity.

8. A heat storage device which includes: a heat storage element; means for imparting heat to the element to be stored therein; heat insulating means exterior to and enclosing the element, for preventing loss of heat therefrom; two vertical airways extending through the element, connected together at their tops and terminating at their bottoms one in an air inlet chamber and the other in an air outlet chamber; and means to force air, from the inlet chamber, through both airways successively and through the outlet chamber, to convey heat away from the device.

9. A heat storage device which includes: a heat storage element; means for imparting heat to the element to be stored therein; heat insulating means exterior to and enclosing the element, for preventing loss of heat therefrom; a passageway in the element and means to force a fluid through the passageway to convey heat away from the device; the passageway being divided into two portions, through which the fluid flows successively, the portions being so arranged that the fluid is in static equilibrium, with respect to thermal effects.

10. A heat storage device which includes: a heat storage element; means for imparting heat to the element to be stored therein; heat insulating means exterior thereto and enclosing the element, for preventing loss of heat therefrom; a passageway in the element and means to force a fluid through the passageway to convey heat away from the device; the passageway being so arranged that the fluid in a portion thereof is in static equilibrium with the fluid in the balance thereof, with respect to thermal effects.

11. A heat storage device which includes: a heat storage element within a heat insulating enclosure; means for heating the element; a passageway in the element; means for forcing a fluid through the passageway for conveying heat away from the element; the passageway being arranged so that the fluid therein is in temperature-pressure equilibrium.

12. A heat storage device which includes; heat storage material and means for heating the same; a passageway arranged in heat exchange relation with the storage material, for directing the flow of a fluid from an inlet chamber to an outlet chamber for conveying heat away from the storage material; and an aperture in a wall of the outlet chamber for admitting thereto cooler fluid for tempering the hot fluid therein before the same is discharged therefrom.

13. A heater as defined by claim 12 characterized by the fact that the aperture is adjustable.

14. In a heater as defined by claim 12, means for forcing the fluid through the passageway and through the aperture.

15. In a heater as defined by claim 12, means for adjusting the relative proportions of heated fluid and cooler fluid entering the outlet chamber.

16. A heat storage device which includes: a cylinder of rigid heat storage material, a dome on the top of the cylinder and a pad of insulating material covering the outer surface of the dome and of the cylinder and extending below the cylinder, a vacuumized chamber formed to fit snugly over the pad so that the pad at all points forms a cushion between the cylinder and the chamber; heat insulating material beneath the cylinder and supporting the same above a fixed base plate; and a passageway through the last mentioned insulating material and through the cylinder for directing the flow of a fluid for conveying heat away from the cylinder, and means for heating the cylinder.

RALPH C. ROE.